United States Patent [19]
Haston et al.

[11] Patent Number: 5,312,066
[45] Date of Patent: May 17, 1994

[54] RESTRAINT BELT RETRACTOR

[75] Inventors: David V. Haston, Glendora; John A. Churilla, Riverside, both of Calif.

[73] Assignee: Pacific Scientific Company, Newport Beach, Calif.

[21] Appl. No.: 787,382

[22] Filed: Nov. 4, 1991

[51] Int. Cl.⁵ .............................................. B60R 22/36
[52] U.S. Cl. ............................................ 242/107.40 B
[58] Field of Search ......... 242/107, 107.4 R, 107.4 B, 242/76; 280/806, 807, 808

[56] References Cited

U.S. PATENT DOCUMENTS

| | | | |
|---|---|---|---|
| 3,335,974 | 8/1967 | Glauser et al. | 242/107.4 R |
| 3,402,899 | 9/1968 | Wright, Jr. et al. | 242/107.4 R |
| 3,495,786 | 2/1970 | Hemens | 242/107.4 R |
| 3,510,085 | 5/1970 | Stoffel | 242/107.4 B |
| 3,770,225 | 11/1973 | Boblitz | 242/107.4 R |
| 3,851,835 | 12/1974 | Fohl | 242/107.4 B |
| 3,948,460 | 4/1976 | Kondziola | 242/107.4 A |
| 3,967,794 | 7/1976 | Fohl | 242/107.4 R |
| 3,979,083 | 9/1976 | Fohl | 242/107.4 B |
| 4,029,267 | 6/1977 | Slipper | 242/107.4 A |
| 4,148,446 | 4/1979 | Sugar | 242/107.4 A |
| 4,278,216 | 7/1981 | Takada | 242/107.4 B X |
| 4,392,619 | 7/1983 | Fohl | 242/107.2 |
| 4,393,995 | 7/1983 | Tukamoto | 242/107.4 B X |
| 4,461,434 | 7/1984 | Butenop | 242/107.4 B |
| 4,508,289 | 4/1985 | Singer et al. | 242/107.4 B |
| 4,509,707 | 4/1985 | Ernst et al. | 242/107.4 A |
| 4,518,131 | 5/1985 | Butenop et al. | 242/107.4 B |
| 4,562,977 | 1/1986 | Hollowell | 242/107.4 D |
| 4,564,155 | 1/1986 | Tsukamoto | 242/107.4 B X |
| 4,618,108 | 10/1986 | Butenop et al. | 242/107 |
| 4,619,418 | 10/1986 | Butenop | 242/107.4 A |
| 4,645,138 | 2/1987 | Kapanka | 242/107.4 B X |
| 4,727,640 | 3/1988 | Hollowell | 242/107.4 D X |
| 4,832,280 | 5/1989 | Haland et al. | 242/76 X |
| 4,902,041 | 2/1990 | Corbett et al. | 242/76 X |
| 4,925,124 | 5/1990 | Hoyt et al. | 242/107.4 B X |
| 4,979,694 | 12/1990 | Grabinski et al. | 242/107 |

Primary Examiner—Daniel P. Stodola
Assistant Examiner—John P. Darling
Attorney, Agent, or Firm—Knobbe, Martens, Olson & Bear

[57] ABSTRACT

A shaft on which a restraint belt is wound is rotatably mounted in the side walls of a U-shaped frame. A driving hub mounted on the shaft drives a locking hub through a clutch formed of ball bearings mounted in recesses in the faces of the hubs. Belt payout rotation of the shaft at a predetermined acceleration will cause the locking hub to rotationally lag. This causes the locking hub to move axially and further causes locking teeth on said locking hub to engage holes in the sidewall of the frame. This prevents further rotation until the belt extension load on the belt is removed.

14 Claims, 5 Drawing Sheets

RESTRAINT BELT RETRACTOR

FIELD OF THE INVENTION

The present invention relates to safety belt retractors which are used in vehicles to restrain an occupant in the seat in the event of an emergency.

BACKGROUND OF THE INVENTION

Vehicle safety belts typically include a retractor mechanism which causes the belt to automatically wind onto a spring loaded reel when not in use. The retractor also insures that the belt remains flush against the person's body as the person changes seated positions, thus allowing the person to move freely without having to manually adjust the belt. In order to secure the person in the event of an emergency, the retractor also has a locking mechanism which senses the emergency condition and locks the reel, thus preventing further extension of the belt and keeping the person secured against the seat.

Typically a retractor responds in an emergency situation by sensing the deceleration of the vehicle, or the rotational acceleration of the reel. In an example of an acceleration sensing mechanism a freely rotating inertia element senses the belt unwinding, angular acceleration of the reel. As the reel accelerates, the rotation of the inertia element lags behind the rotation of the reel assembly. The relative change in position causes the inertia element to move a locking or braking mechanism into position and brake the reel. Some retractors, have locking means which respond to both the acceleration of the belt and the deceleration of the vehicle.

The locking mechanism in some prior art involves a ratchet attached to one or both sides of the reel which is surrounded by teeth. There is also either a bar or a pawl which is capable of locking the reel by engaging the ratchet teeth, and which moves into this locking position upon sensing the emergency condition. The ratchet teeth may be located either on the radial interior or exterior relative to the retractor housing. That is, the ratchet may be designed as a wheel with teeth pointing outward on the outside of the wheel or as a ring with teeth pointing inward on the inner circumference of the ring. Inwardly extending teeth or locking elements offer certain advantages, but such systems have other complexities concerning the mounting of components.

SUMMARY OF THE INVENTION

The present invention relates to an improved safety belt retractor directed toward improving the performance and reducing the manufacturing costs associated with the prior art. The invention comprises a frame, preferably U-shaped, and a reel or reel shaft which rotates on its axis within the frame. A safety belt is wound on the reel and a conventional power spring or other means urges the belt to recoil onto the reel. A locking assembly which is driven by the reel shaft is responsive to the relative rotation between the reel and an inertia element that causes the reel to lock. That is, further strap payout is prevented when a function of the reel such as angular acceleration reaches a predetermined threshold. The locking mechanism includes a locking hub having one or more teeth that correspond to one or more holes in the frame. The reel locks when the teeth enter the holes in the frame. This arrangement reduces the number of parts for the retractor since no special pawl or lock bar is needed to halt the reel or to mount the reel. It is the frame itself that directly receives the locking load and directly supports the reel.

In accordance with one aspect of the invention, the set of teeth and corresponding holes are spaced around the shaft of the reel in a circle. This provides many points of contact which are simultaneously engaged when the shaft is locked.

In accordance with another aspect of the invention, the locking mechanism comprises two hubs which are connected to the shaft of the reel. An outer hub is mounted to always rotate with the shaft. An inertia locking hub may rotate on the shaft and therefore change its angular position with respect to the fixed outer hub. The toothed inertia hub may also slide axially along the shaft, but it is normally urged toward the fixed hub by a spring so that locking teeth on the inertia hub do not engage locking teeth formed by holes in the frame. A set of bearings which lie in recesses between the hubs transmit rotation to the inertia hub. The recesses are shaped such that when the inertia of the inertia hub causes it to lag rotationally with respect to the fixed hub, the ball bearings start to roll out of the recesses pushing the inertia hub axially on the shaft to cause its lock teeth to engage the frame lock teeth. Interengaging lugs on the hubs permit limited relative rotation between the hubs, but the locked inertia hub quickly prevents rotation of the outer hub and thereby locks the reel shaft.

In accordance with another aspect of the invention, the retractor has a strap guide, preferably made of plastic, which has a front part that spans the width of frame and two side arms to mount it on the frame. The front part has a slot through which the belt passes in order to insure proper coiling of the belt. The support arms each have a hole with an annular flange that extends into the frame holes, and the reel shaft extends through the flanges. The flanges thus form bearings for the reel shaft, and the shaft in turn positions the belt guide. This minimizes the number of parts because the strap guide is fastened to the frame without any extra parts and no separate bushing for the reel shaft is required. The frame teeth, which lock the inertia hub, surround the shaft, spaced radially outwardly from the flange bearings.

DETAILED DESCRIPTION OF THE PREFERRED EMBODIMENT

Figure 1:
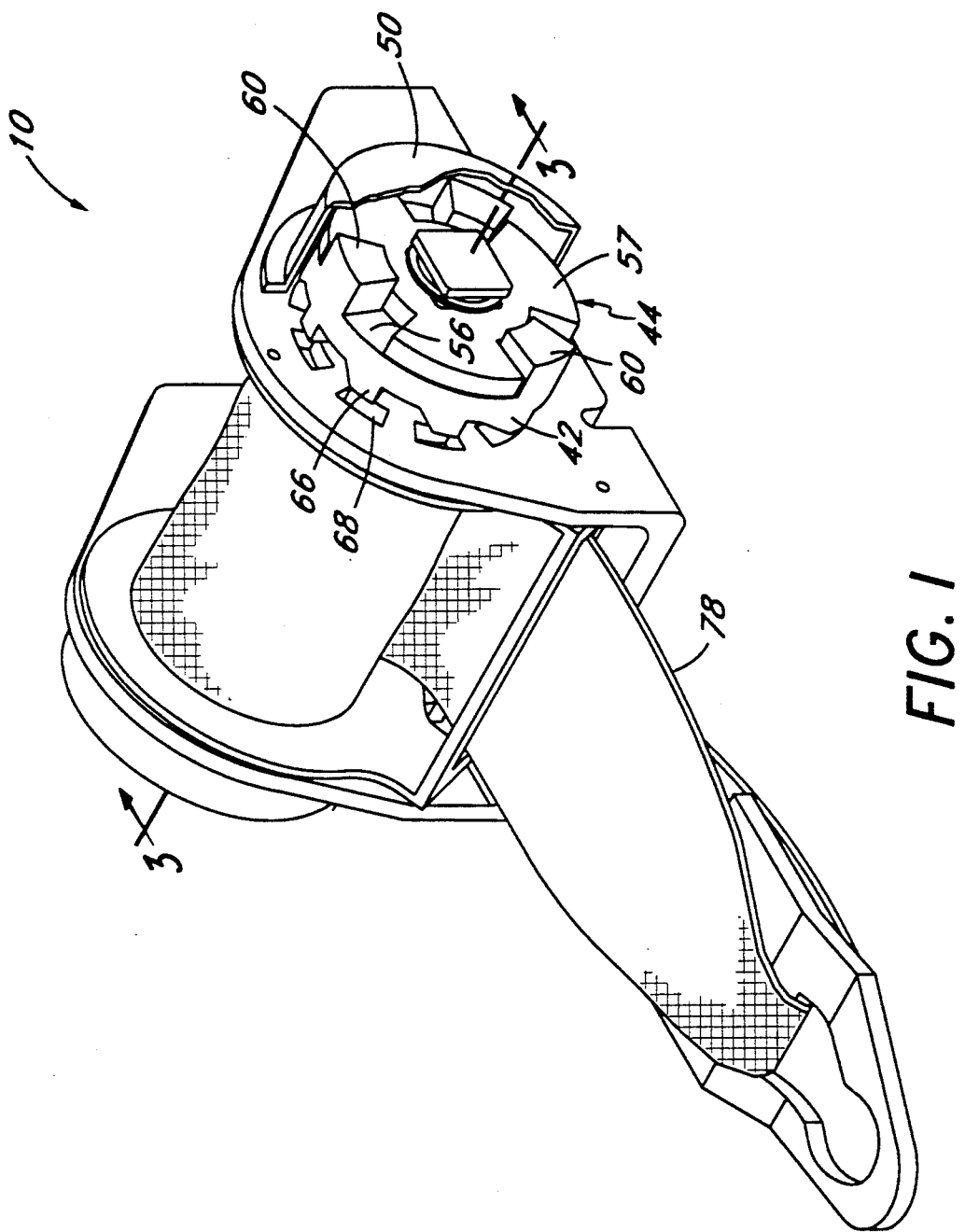
FIG. 1 is a perspective view of an exemplary retractor embodying the present invention.
Figure 2:
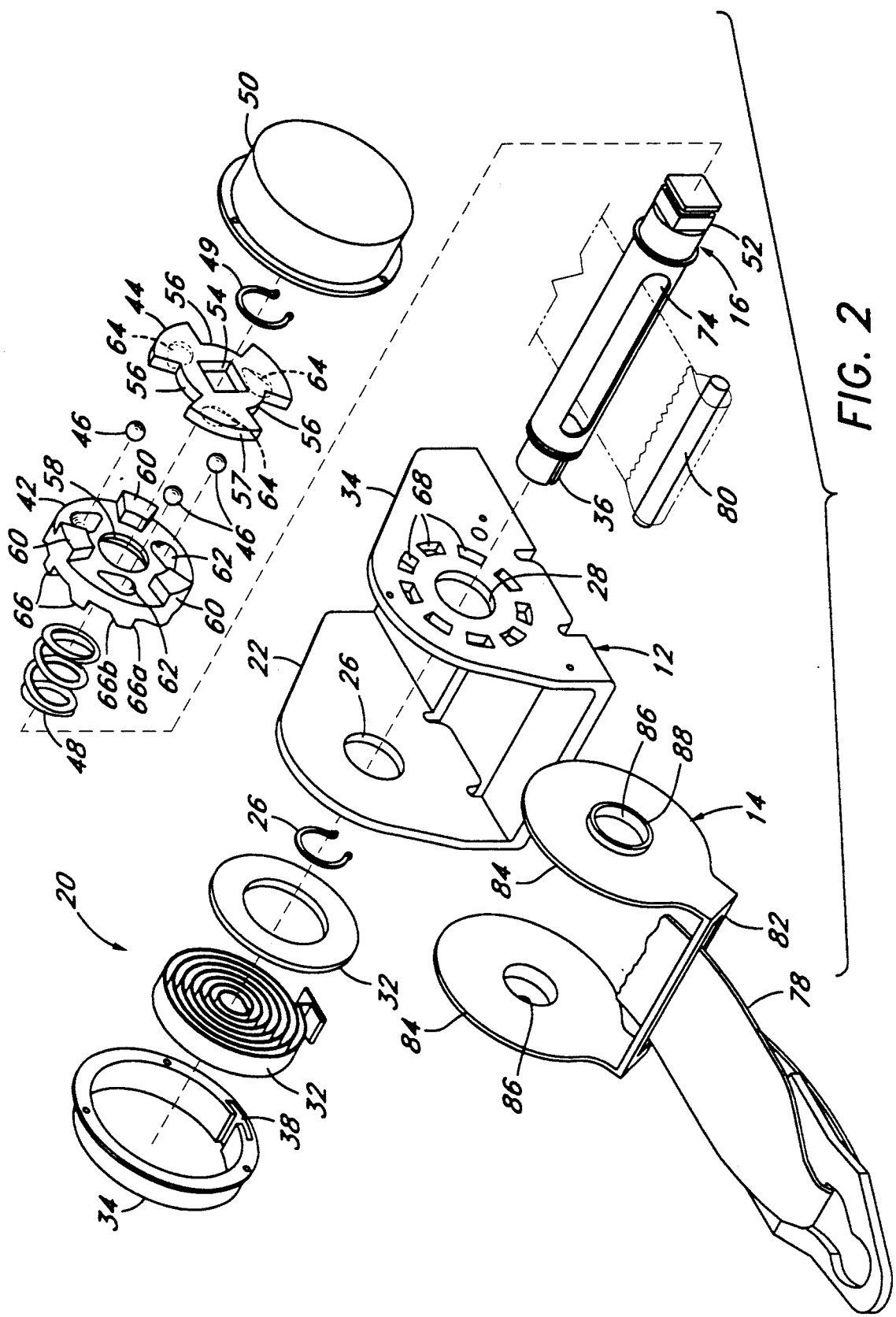
FIG. 2 is a an exploded perspective view of the retractor of FIG. 1.
Figure 3:
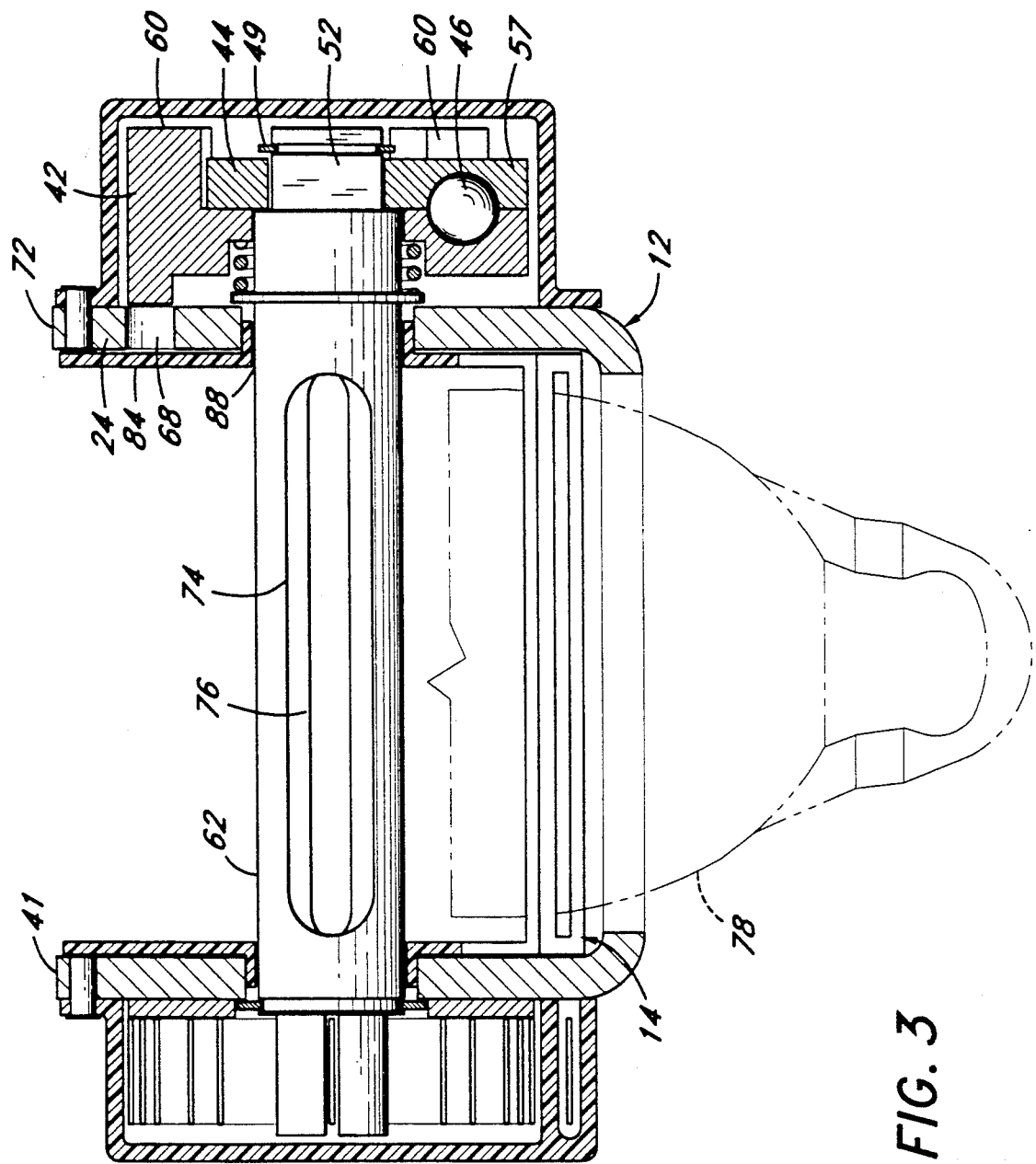
FIG. 3 is a front cross-sectional view of the retractor on line 3—3 of FIG. 1.

Referring to the drawings, there is shown a safety belt retractor 10 which comprises a U-shaped frame 12, a belt guide 14, a reel shaft 16, a locking assembly 18, and a recoil assembly 20. The frame 12 comprises a bottom wall 21 and a pair of spaced, upstanding sidewalls 22 and 24, each of which has a center hole 26 and 28. The reel shaft 16 extends between the sidewalls 22 and 24 of the frame 12 and through the holes 26 and 28. It is held in place by a snap-on retaining ring 29.

The belt guide 14 is a plastic component comprising a generally flat front piece 82 and two disk-shaped side arms 84. The front piece 82 has a slot through which the belt 78 passes as it uncoils from the retractor 10. The side arms 84 rest against the inner surfaces of the frame sidewalls 22 and 24. Each side arm 84 has a center hole 86 with an axially extending, annular flange 88 which protrudes outward from the sidearm. The flanges 88 fit into the center holes 26,28 in the sidewalls 22, 24 of the frame 12 and serve as a bushing between the reel shaft 16 and the frame 12, thus eliminating the need for separate bearings or bushings. The belt guide bushings 88 can rotate in the frame and the shaft rotates within the bushings.

The locking assembly 18 is located on the outer side of the sidewall 24 on one end of the reel shaft 16. The recoil assembly 20 is located on the outer side of the other sidewall 22. The reel shaft 16 and the locking assembly 18 rotate freely on the frame 12.

The recoil assembly 20 comprises a power spring 30, a washer 32, and a plastic cover 34. One end of the torsion spring 30, which is located in the center, is inserted into a slot 36 on the end of the reel shaft 16. The other end of the torsion spring 30, which is located at the outer circumference of the spring, is inserted into a slot 38 in the cover 34. The spring 30 is wound as the reel shaft 16 rotates in the belt unwinding direction, causing the reel shaft to be biased toward an angular position in which the power spring 30 is unwound.

The locking assembly 18 comprises a locking hub 42, an outer driving hub 44, three ball bearings 46, a calibration, compression spring 48 and a retaining ring 49. A plastic cover 50 attached to the frame 12 encloses the assembly 18. The locking end 52 of the reel shaft 16 is formed with a square cross-section. The outer hub 44 has a corresponding square hole 54 in its center, allowing the hub 44 to be drivingly connected onto the end 52 of the reel shaft 16. This ensures that the hub 44 and the reel shaft 16 will not rotate relative to each other. The retaining ring 49 snaps onto the end 52 of the reel shaft 16 and secure the outer hub 44 on the shaft. The outer hub 44 also has three equidistantly spaced slots 56 near the circumference of the hub 44, separating three radially extending lugs 57.

The locking hub 42 has the same diameter as the driving hub 44 and is located on the reel shaft 16 between the driving hub 44 and the sidewall 24 of the frame 12. The locking hub 42 has a center hole 58 of a slightly larger diameter than the reel shaft 16, allowing it to move rotationally and axially relative to the shaft. The locking hub 42 also has three lugs 60 located near the outer circumference of the hub 42 which protrude axially toward the driving hub 44. The lugs 60 which are equidistantly spaced and of the same angular width, fit into the slots 56 in the outer hub 44. The circumferential width of the slots 56 is greater than that of the lugs 60. This arrangement allows the locking hub 42 to be free to rotate through a small angular distance before the lugs 60 and 57 engage.

The coil spring 48 surrounds the reel shaft 16 and is located between the locking hub 42 and the frame sidewall 24. The locking hub 42 is biased by the calibration spring 48 against the driving hub 44 so that the lugs 57 and 60 are intermeshed. The strength of the spring determines the force required to move the locking hub axially, and hence determines the locking threshold.

Both hubs 42 and 44 contain a set of three recesses 62 and 64 located respectively between the lugs 60 and in the lugs 57 between the slots 56. The ball bearings 46 are captured within the facing recesses 62 and 64 between the hubs. Each recess is shaped such that a bearing 46 can rest within the recess but may also start to roll up the ramp in one direction along a ramp extending from the bottom of the recess to the hub axial face. While the recesses 62 and 64 on each of the hubs face each other, the ramps are oriented in opposite directions. Thus, when the hubs 42 and 44 turn relative to one another in one direction, the ball bearings 46 roll up the ramps, thereby separating the two hubs 42 and 44. When the hubs are together, the lugs 60 on the locking hub 42 are located at one circumferential end of the slots 56 in the outer hub 44. The combination of the calibration spring 48 and the ball bearings 46 in the recesses biases the locking hub 42 in this position.

The locking hub also has a number of locking teeth 66, preferably nine, located near the outer circumference of the hub 42 on the side opposite from the lugs 60. The teeth 66 are circumferentially spaced and sized to fit into nine circumferentially spaced holes 68 in the sidewall 24 of the frame 12. The ring of holes is concentric with, but spaced outwardly from the central hole 28. The locking hub 42 is movable away from the outer hub 44 so that the teeth 66 fit into the holes 68 in a locked position. Each of the teeth 66 has a circumferentially flat, radially aligned, edge 66a and an inclined edge 66b. The edges are oriented in the same directions around the circumference of the locking hub 42. The edges 66a, which are generally perpendicular to the hub face, form the leading edges when the reel is rotated in a belt unwinding or payout direction. When the locking hub 42 is in the locked position, the edges 66a will prevent it from further rotation in the belt unwinding direction, while the inclined edges 66b will cause the hub 42 to disengage from the locked position upon rotation in the retraction direction.

The reel shaft 16 has two axially elongated slot 74 and 76 that extend diametrically through the shaft between the sidewalls 22 and 24 of the frame 12. The slots 74 and 76 are located on opposite sides of the shaft 16 and meet in the center allowing a safety belt 78 to be inserted through the shaft 16. One slot 74 is wider than the other slot 76. The safety belt 78 terminates in a small loop into which an anchoring pin 80 is inserted. The pin 80, being of greater diameter than the width of slot 78, cannot fit through the smaller slot 76 in the reel shaft 16. However, the pin 80 does fit into the wider slot 74. Thus, the support pin 80 is captured within the wider slot 74 in the reel shaft 16 with the safety belt 78 extending through the smaller slot 76 and out the other side of the shaft 16. This causes the belt 78 to be secured onto the reel shaft 16 while at the same time ensuring that the belt rotates with the shaft.

OPERATION

Figure 4:
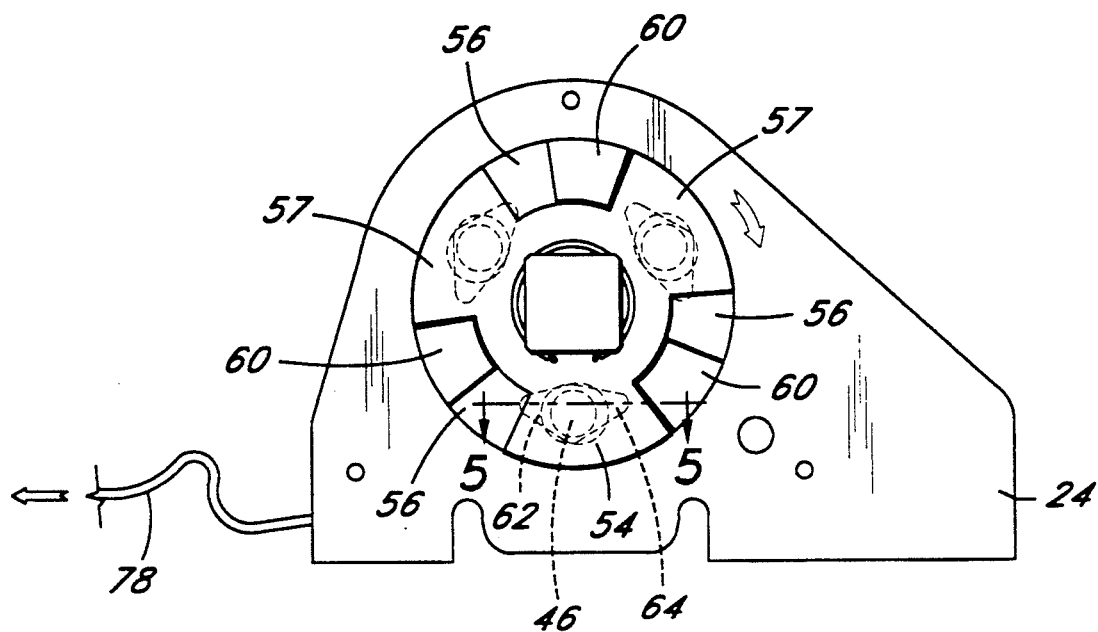
FIG. 4 is a schematic side elevational view illustrating a portion of the retractor in its unlocked position.
Figure 5:
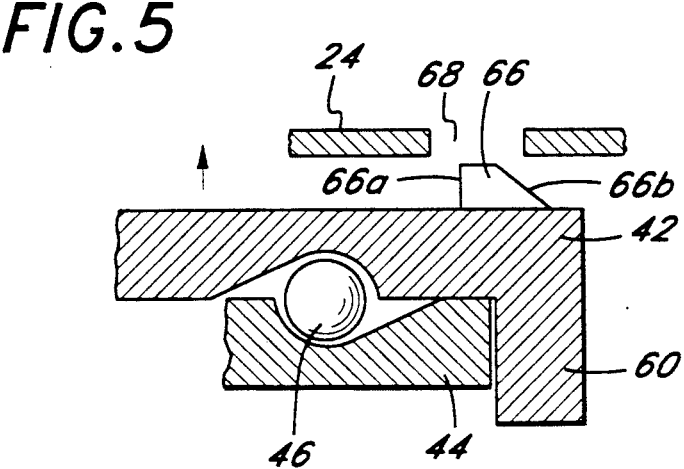
FIG. 5 is a cross section on line 5—5 of FIG. 4.

When not in use, the belt 78 is coiled on the reel shaft 16, urged into that position by the power spring 30. This is the fully retracted position. The locking hub 42 and the driving hub 44 opposing faces are flush against one another, as seen in FIGS. 1 and 5, due to the force of the spring 48, and orientation of the ramp recesses causing the ball bearings 46 to be situated within the recesses 62 and 64 at the bottom of the ramps. The lugs 60 on the locking hub 42 are flush against one end of each of the spaces 56 adjacent one circumferential edge of the lugs 57 on the driving hub 44, as seen in FIG. 4.

If the belt 78 is extended from the retractor 10 relatively slowly, the coiled portion of the safety belt 78 begins to unwind. The reel shaft 16 and the locking assembly 18 rotate with the unwinding of the belt causing the torsion spring 30 to wind. The locking hub 42 is rotated by the bearings 46 in the recesses 62 and 64 in the position of FIG. 4. The winding of the torsion spring 30 provides torque on the reel shaft 16 in the opposite direction to the uncoiling motion so that when the belt 78 is released, it retracts onto the reel shaft 16.

Figure 6:
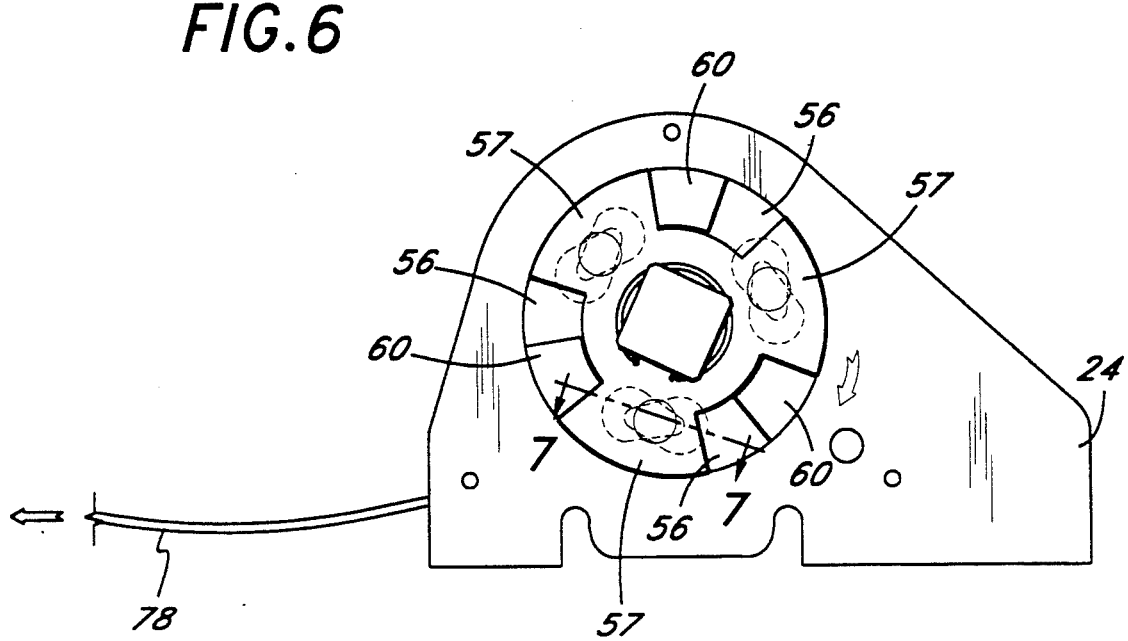
FIG. 6 is a view similar to FIG. 4 with the retractor in its locked position.
Figure 7:
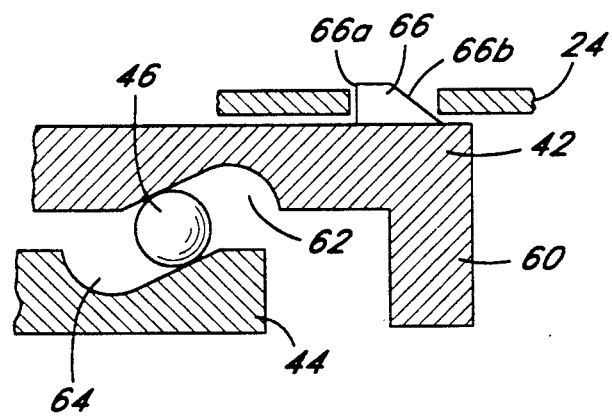
FIG. 7 is a cross section on line 7—7 of FIG. 6.

If the belt 78 is extended very quickly or suddenly, as in an emergency situation, the locking hub 42, which rotates freely on the shaft 16, tends to lag behind the rotation of the outer hub 44 due to the rotational inertia of the locking hub 42. The mass of the locking hub is considerable in view of its lugs extending only one force, and axially extending teeth in the other face. As the locking hub 42 lags the outer hub 44 rotationally, the lugs 60 slide along the slots 56 in the outer hub 44 toward the other circumferential end of the slots 56, as seen in FIG. 6. The relative rotation also causes the bearings 46 between the hubs 42 and 44 start to roll up the ramps in the recesses 62 and 64, as seen in FIG. 7, thereby pushing the locking hub 42 axially toward the sidewall 24 of the frame 12 against the force of the spring 48. The components in effect form a clutch. The spacing of the components is such that the bearings 46 cannot roll completely out of the recesses 62 and 64.

If the acceleration reaches a predetermined threshold, the locking hub 42 will be pushed far enough to allow the teeth 66 to fit within the holes 68 with the edges 66a engaging the hole edges in the sidewall 24 preventing further rotation of the locking hub 42, as seen in FIG. 7. The lugs 60 engaging the lugs 57, as seen in FIG. 6, prevent further-unwinding rotation of the outer ordinary hub 44. Transmitting the locking load through the heavy lugs 60 and 57 advantageously bypasses the bearings 46 and recesses 62 and 64. The locked driving bolt, in turn, prevents further rotation of the reel 16, as well as further uncoiling of the belt 78. This will restrain the occupant from moving forward when the vehicle rapidly decelerates. The torque on the reel shaft 16 caused by the tension in the belt 78 will cause the locking hub 42 to remain held in the locked position. When the belt relaxes, the torsion spring 30 begins to recoil the belt 78 back onto the reel shaft 16. The ball bearings 46 transmit this lighter torque to the locking hub 42. Since the teeth 66 have inclined surfaces 66b in the direction of the recoil rotation, they are automatically urged axially and disengaged from the frame 12. The locking hub 42 is pushed axially back into its initial position against the outer hub 44 by the spring 48.

One of the advantages of the invention is that the ball locking load is transmitted directly to the retractor frame 12 without the need for an additional structure attached to the frame. Related to that is the fact that the locking lugs 66 on the locking hub 60 fit directly into the mating holes 68 in the frame sidewall 24. With this arrangement, the sidewall 24, with its central hole 28 is available to serve as a support for the shaft assembly 16. Further reducing the number of parts required is the use of the annular wall 88 forming a bearing for the shaft 16 while being integral with the belt guide 14.

What is claimed is:

1. A restraint belt retractor comprising:
   a frame having a pair of spaced sidewalls, one of said sidewalls having a ring of spaced locking holes;
   a shaft rotatably mounted within the sidewalls, said ring of locking holes being concentric with but spaced radially outwardly from said shaft;
   a driving hub fixed to said shaft spaced axially outwardly from said one sidewall;
   a locking hub rotatably mounted on said shaft and positioned between said driving hub and said one sidewall, said locking hub having a ring of spaced teeth that extend axially toward said frame locking holes, said locking hub being movable axially from a locked position wherein said hub teeth extend into said frame locking holes into an unlocked position wherein the hub teeth are not in said locking holes;
   a spring urging said locking hub into said unlocked position; and
   a clutch interengaging said hubs for causing said driving hub to rotate said locking hub during belt unwinding shaft rotation, while at a predetermined rotational acceleration of said shaft moving said locking hub axially on said shaft into said locked position; and
   a guide having a pair of side arms rotatably mounted on said shaft and having a portion spaced radially outwardly from said guide sidearms having a hole there through for guiding movement of a belt as it s wound and unwound from said shaft, said guide sidearms including annular flanges which extend axially into holes within the sidewalls of said frame for form bearings for said shaft.

2. The retractor of claim 1, wherein said clutch includes a plurality of ramped recesses formed in said driving hub, a plurality of mating recesses formed in said locking hub, and a plurality of rolling bearings captured between the recesses of said hubs.

3. The retractor of claim 2, wherein said recesses and bearings are constructed to cause said bearings to start to roll out of said recesses and to move said locking hub axially when said locking hub rotationally lags said driving hub.

4. The retractor of claim 1, wherein said hubs have lugs which interengage when said locking hub is in its locked position so that the locking hub holds said driving hub and said shaft in a rotationally locked position.

5. The retractor of claim 4, wherein said lugs are spaced so that when said locking hub is in its unlocked position, rotation of said driving hub in a belt unwinding direction is transmitted through said clutch rather than through said lugs.

6. The retractor of claim 4, wherein said locking hub lugs extend axially into spaces between said driving hub lugs which extend radially.

7. A restraining belt retractor comprising:
   a frame
   a retractor shaft rotatably mounted in said frame;
   a driving hub fixed on said shafts and spaced axially outwardly from said frame, said hub having a plurality of radially extending, circumferentially spaced lugs;
   a locking hub having a plurality of circumferentially spaced lugs that extend axially into spaces between said driving hub lugs, the spaces between said driving hub lugs being circumferentially greater than the circumferential dimension of said locking hub lugs so as to permit limited relative rotation between said hugs;

means positioned between said hubs for transmitting torque from said driving hub to said locking hub in the belt unwinding direction so that the rotation of said shaft in the belt unwinding direction causes said driving hub to drive said locking hub in the belt unwinding direction below a predetermined belt unwinding acceleration, said locking hub having inertia that will cause it to rotationally lag said locking hub at said predetermined acceleration, said torque transmitting means being adapted to move said locking hub axially into a locked position with respect to said frame wherein further unwinding rotation of said locking hub is prevented, the lugs on said hubs being arranged such that said locking hub restricts further unwinding rotation of said driving hub and hence said shaft when said locking hub is in its locked position; and a guide having a pair of side arms with holes therethrough for rotatably mounting the shaft in said guide, said guide having a portion spaced radially outwardly from said side wall holes having a slot therethrough for guiding movement of a belt as its wound and unwound from said shaft.

8. The retractor of claim 7, including a spring urging said locking hub out of its locked position and axially towards said driving hub.

9. The retractor of claim 7, wherein said locking hub includes a ring of spaced locking teeth which extend into locking holes in said frame when said locking hub is in its locked position.

10. The retractor of claim 9, wherein said locking hub teeth are beveled on one edge so that when said locking hub is urged to rotate in a belt winding direction, the beveled edges of said locking teeth engage the edges of the locking holes in said frame in a manner to allow said locking hub to move axially towards said driving hub in response to the urging of said spring.

11. A restraint belt retractor comprising a frame having a bottom wall and a pair of spaced sidewalls connected to said bottom wall, each of said sidewalls having a hole formed therethrough, a reel shaft extending through said holes and having a restraint belt wound thereon, and a belt guide having a slot through which said belt extends during its winding and unwinding movement on said shaft, said guide having a pair of spaced side arms positioned adjacent to said frame sidewalls, each having an axially extending annular flange that extends into a frame sidewall hole between the frame and the shaft to form bearings for said shaft.

12. The retractor of claim 11, including a plurality of holes formed in one of said frame sidewalls spaced outwardly from one of said guide flanges, and a movable locking hub interconnected to said shaft to fit within said locking holes in response to a predetermined acceleration of said shaft.

13. A method of assembling a restraint belt retractor comprising positioning side arms of a belt guide adjacent spaced sidewalls of a retractor frame, with an annular portion of each side arm extending axially into a respective hole in each side wall, and with a portion of said guide extending outwardly from said arms to receive and guide a belt, and inserting a belt reel shaft through said annular portions whereby the annular portions serve as bushings rotatably supporting the shaft.

14. A restraint belt retractor comprising:

a frame having a pair of spaced sidewalls, one of said sidewalls having a ring of spaced locking holes;

a shaft rotatably mounted within the sidewalls for supporting a restraint belt, said ring of locking holes being concentric with but spaced radially outwardly from said shaft;

a driving hub fixed to said shaft spaced axially outwardly from said one sidewall said hub having a plurality of radially extending, circumferentially spaced lugs;

a locking hub having a plurality of circumferentially spaced lugs that extend axially into spaces between said driving hub lugs, the spaces between said driving hub lugs being circumferentially greater than the circumferential dimension of said locking hub lugs so as to permit limited relative rotation between said hugs, said locking hub having a ring of spaced teeth that extend axially toward said frame locking holes, said locking hub being movable axially from an unlocked position wherein said hub teeth are spaced from said frame locking holes into locked position wherein the hub teeth are in said locking holes;

a plurality of spaced ramped recesses formed in an axial wall of said driving hub lugs facing said locking hub, a plurality of spaced mating recesses in said locking hub facing said driving hub and being positioned between said locking hub lugs, a plurality of rolling elements captured between the recesses of said hubs, said recesses and said elements being constructed to cause said elements to start a roll out of said recesses and to move said locking hub axially into said locked position when said locking hub rotationally lags said driving hub, said driving hub and said locking hub lugs being spaced so that when said locking hub is in its unlocked position, rotation of said driving hub in a belt unwinding direction is transmitted through said rolling elements and recesses rather than through said lugs;

a spring urging said locking hub out of its unlocked position; and a guide having a pair of side arms with holes therethrough for rotatably mounting the shaft in said guide, said guide having a portion spaced radially outwardly from said side wall holes having a slot therethrough for guiding movement of a belt as its wound and unwound from said shaft.

* * * * *